United States Patent
Wu et al.

(10) Patent No.: US 7,965,414 B2
(45) Date of Patent: Jun. 21, 2011

(54) SYSTEMS AND METHODS FOR DETECTING IMAGE QUALITY DEFECTS

(75) Inventors: Wencheng Wu, Webster, NY (US); Jing Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 587 days.

(21) Appl. No.: 12/018,540

(22) Filed: Jan. 23, 2008

(65) Prior Publication Data
US 2009/0185204 A1 Jul. 23, 2009

(51) Int. Cl.
*H04N 1/60* (2006.01)
*H04N 1/46* (2006.01)
*G06K 9/00* (2006.01)

(52) U.S. Cl. .......................... 358/1.9; 358/518; 382/167
(58) Field of Classification Search ........................ None
See application file for complete search history.

(56) References Cited

U.S. PATENT DOCUMENTS

| | | | |
|---|---|---|---|
| 6,377,758 B1 | 4/2002 | OuYang et al. | |
| 7,376,269 B2 * | 5/2008 | Klassen et al. | 382/167 |
| 2005/0025383 A1 * | 2/2005 | Domingo et al. | 382/266 |
| 2005/0248801 A1 * | 11/2005 | Miyahara et al. | 358/1.14 |
| 2005/0286742 A1 * | 12/2005 | Rasmussen et al. | 382/112 |
| 2006/0077489 A1 | 4/2006 | Zhang et al. | |
| 2006/0110009 A1 | 5/2006 | Klassen et al. | |
| 2006/0274337 A1 | 12/2006 | Dalal et al. | |

* cited by examiner

*Primary Examiner* — King Y Poon
*Assistant Examiner* — Christopher D Wait
(74) *Attorney, Agent, or Firm* — Oliff & Berridge, PLC

(57) ABSTRACT

An approach for detecting and correcting printing system print quality defects is disclosed that allows defects to be corrected based on an analysis of image data collected over time, across many separate images, under a wide variety of system status and environmental conditions to allow detection of print quality defects that would otherwise be undetectable. The approach supports the detection and correction of defects related to colorant appearance effects that are correlated to colorant interactions. Techniques are described by which allow image data to be efficiently collected and stored to support a wide range of defect processing techniques. Defect processing may be performed in parallel with print job operations using spare processor CPU cycles and/or may be performed off-line by either the printing system processor or a separate defect processing system. Detected print quality defects may be corrected for using one or more interpolation techniques.

21 Claims, 10 Drawing Sheets

SYSTEMS AND METHODS FOR DETECTING IMAGE QUALITY DEFECTS

BACKGROUND

This invention generally relates to systems and methods for detecting and correcting image quality defects generated by a rendering device, or printer.

Detection, and the subsequent correction, of image quality defects ensures the production of quality images by image rendering devices. There are various existing approaches for detecting image quality defects in images rendered by image rendering devices. For example, U.S. Pat. No. 6,377,758 by Ou Yang, et al., entitled METHOD AND SYSTEM FOR ANALYZING IMAGING PROBLEMS filed Apr. 23, 2002, describes a method and a system for analyzing imaging problems by printing an image, scanning the printed image and comparing the scanned image and the original image on a pixel by pixel basis to detect defects generated by an intermediate imaging member.

Further, U.S. Patent Application Publication No. 20060077489 by Zhang, et al., entitled UNIFORMITY COMPENSATION IN HALFTONED IMAGES filed Aug. 20, 2004, describes the use of sets of colorant-specific, spatially dependent compensating tone reproduction curves (TRCs) over temporal and spatial spaces of desired uniformity that extend across multiple rendering devices or print engines.

U.S. Patent Application Publication No. 20060110009, by Victor Klassen and Stephen Morgana, entitled SYSTEMS AND METHODS FOR DETECTING IMAGE QUALITY DEFECTS filed Nov. 22, 2004, the disclosure of which is totally incorporated herein by reference, describes an approach that includes identifying regions of interest (ROI) within a printed image that may be used to identify image quality defects. At each ROI, original image data may be compared to captured image data of a corresponding region to determine a color difference of the captured image. The color difference may be subsequently converted from a device independent color space to a device dependent color space. Based on the converted color difference and input intensity of the original image data, a colorant error correction may be determined and/or a scan line and a row line for that particular ROI.

The above approaches can provide substantial improvements in image quality and image consistency; however, they do not compensate for colorant appearance effects that are correlated to colorant interactions. For example, in offset printing, the efficiency with which an ink is absorbed or trapped can be influenced by the presence of another ink laid down earlier. Additionally, trapping efficiency is a function of transfer roller pressures. Spatial variations in those pressures may cause spatial variation in interacting colorant appearance. Related colorant appearance variations associated with print-head-to-print-media pacing variations associated with inkjet technology are also anticipated. In electrophotographic processes, spatial variations, due to, for example, manufacturing tolerances, wear, dirt and component age may produce spatially dependent charge, development field, cleaning field, toner concentration, raster output, raster output power, and/or roller pressure variations which may manifest as spatially dependent colorant appearance nonuniformities or variations. Some component or portion of these colorant appearance variations or nonuniformities may be correlated to interactions between colorants.

SUMMARY

An approach for detecting and correcting the print quality defects of a printing system is described. The approach allows defects to be detected and corrected based on an analysis of image data collected over time, across many separate images, under a wide variety of system status and environmental conditions to allow detection of print quality defects that would otherwise be undetectable.

The approach supports the detection and correction of defects related to colorant appearance effects that may be correlated to colorant interactions. Techniques are described which allow image data to be efficiently collected and stored to support a wide range of defect processing techniques. Defect processing may be performed in parallel with print job operations using spare processor CPU cycles, and/or may be performed as a post-processing operation, by either the printing system processor or a separate defect processing system. Detected print quality defects may be used to support one or more rendered image color correction interpolation techniques, that result in, for example, updates to one or more printing system device dependent color correction LUTs, development/refinement of one or more color correction matrix transformations and/or development/refinement of one or more color correction polynomial fittings.

The approach allows print defect analyses to account for "retransfer" issues and thus improve the accuracy and capability of such detection. Instead of analyzing the color errors by separations, the approach may keep a running image defect log of color errors as a sparse table, which captures spatial and temporal information, input colorants, and resulting color errors detected within printed images, thereby capturing true color and printing system operational information that may be used to identify the inter-colorant interactions and to identify the root causes of the inter-colorant interactions. Further, the approach may assess the reliability, or quality, of detected color errors and may use the defect reliability information within print quality defect detection/correction interpolation processes that analyze image defect log data to identify and correct print quality defects.

Exemplary embodiments may also keep a log of system status parameters and/or measured system environment conditions. In such exemplary embodiments, image defect log entries may be correlated with system status and environment log entries, e.g., based on a common page identifier and/or a common datestamp/timestamp, so that system status and environmental conditions that contribute to image defects may be identified.

BRIEF DESCRIPTION OF THE DRAWINGS

Exemplary embodiments will be described with reference to the accompanying drawings, wherein like numerals represent like parts, and in which.

DETAILED DESCRIPTION OF EMBODIMENTS

Figure 1:
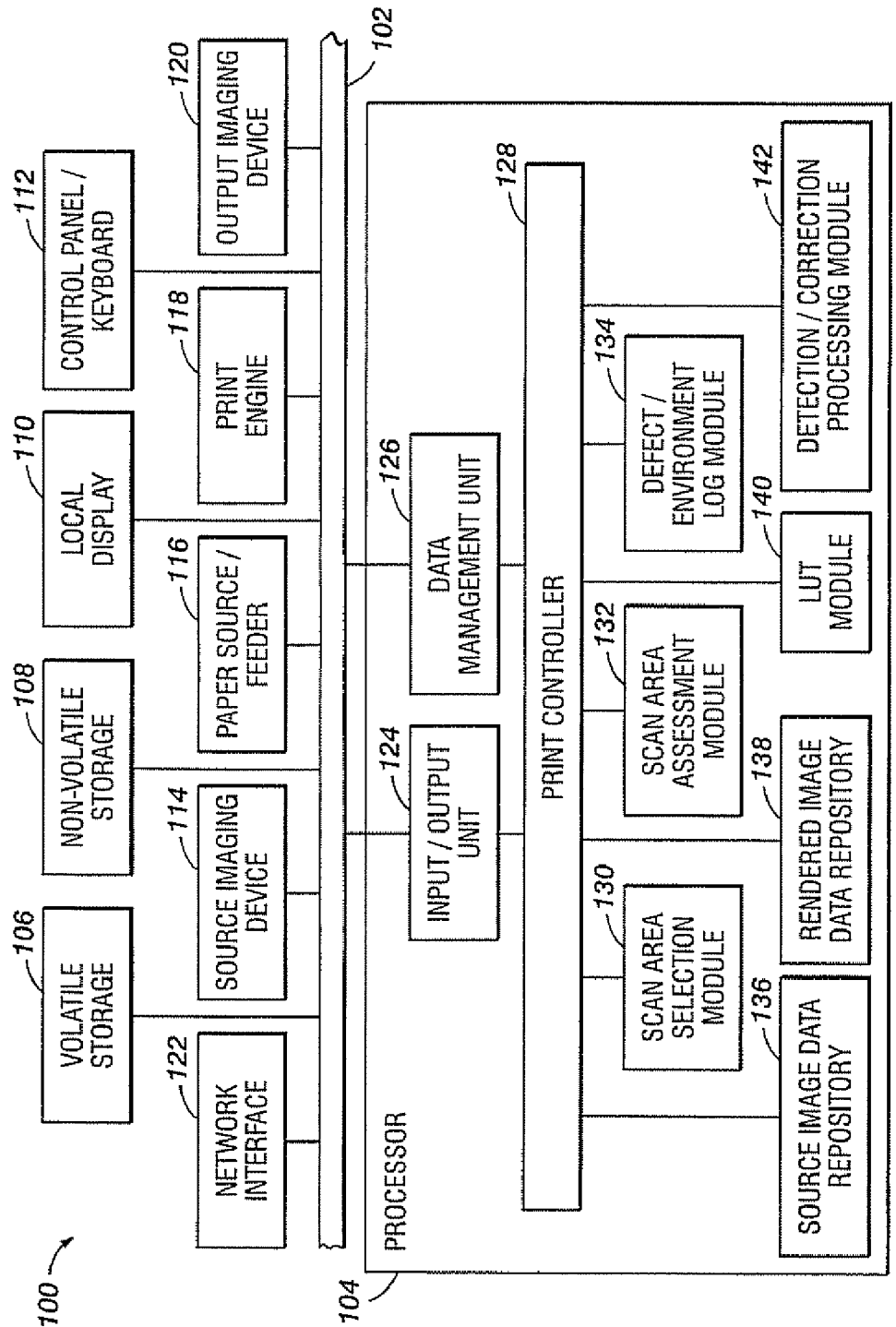
FIG. 1 is a system level block diagram of an exemplary printing system that supports print quality defect detection.

FIG. 1 is a system level block diagram of an exemplary printing system that supports print quality defect detection. As shown in FIG. 1, a printing system 100 that supports print quality defect detection may include a computer system data bus 102 that allows a processor 104 to communicate with, and exchange information with hardware components of the printing system such as: a volatile memory storage 106, which allows the processor 104 to store program instructions in local memory for execution and to store and maintain temporary data necessary for execution of the stored program instructions; a non-volatile storage 108, such as a hard-drive and/or firmware storage, which allows processor 104 to access and retrieve larger bodies of data and program instructions for later use/execution by the processor; a local display 110, which may support a visual interface with a printing system operator; a control panel/keyboard 112, and/or a cursor control device that allow the processor to receive user instructions and/or information and/or feedback; a network interface 122 which allows processor 104 to communicate with and exchange information with network connected processing devices, e.g., such as electronic data storage devices, a digital front end (DFE) processor and/or other printing system components, thereby allowing printing system 100 to receive and store electronic source image data for pages within a print job; a source imaging device 114, which may be used to scan paper-based documents, thereby allowing printing system 100 to locally generate and store electronic source image data for pages within a print job based on a hardcopy original; a paper source/feeder 116 which provides the printing system with paper upon which to transfer reproduction copies of scanned/received page images; a print engine 118 which transfers visual copies of electronically stored images to paper; and an output imaging device 120 that generates electronic rendered image data from hardcopy rendered images.

As further shown in FIG. 1, processor 104 may include internal components that allow the processor to communicate with the above-described hardware components to send and to receive data and instructions over system bus 102. Such components may include: a print controller 128 capable of communicating with and controlling an input/output unit 124 that manages communication exchanges with the system bus 102; and a data management unit 126, which allows the print controller to maintain a local set of control parameters such as counters, pointers, and segments of executable program instructions for execution.

For example, when provided with executable instructions, print controller 128 may, in accordance with instructions/commands received from a user via control panel/keyboard 112 or via a network connection via network interface 122, retrieve and initiate control parameters/pointers for the execution of program instructions related to processing print jobs and performing print quality defect detection. For example, at startup, print controller 128 may retrieve and load program instructions from nonvolatile storage 108 into volatile/nonvolatile memory 106 for execution and may maintain control parameters in data management unit 126 for use in controlling the simultaneous and/or sequential execution of the program instructions retrieved for execution.

For example, as shown in FIG. 1, processor 104 may establish, based on stored program instructions retrieved for execution from nonvolatile storage 108:

a print controller 128 that may control overall operation of the printing system and the production of hardcopy output based on original hardcopy and/or electronically stored images in accordance with operator provided print job control parameters and which may control/coordinate print quality defect detection and correction processes; a scan area selection module 130 that controls the creation of user defined scan area and/or controls scan strategies used to collect source image data and rendered image data; a scan area assessment module 132 that assesses scan area image data for its suitability for use in supporting print quality defect detection; a defect/environment log module 134 that generates/stores image defect data and maintains image data log and/or system environment log; a source image repository 136 that collects/stores source image data and/or source image scan area data and oversees the deletion of source image data; a rendered image repository 138 that collects/stores rendered image data and/or rendered image scan area data and oversees the deletion of rendered image data; a lookup table (LUT) module 140 that controls access to lookup tables that may be used to convert from device independent color schemes, e.g., L*a*b*, or standard RGB (sRGB), to device dependent color schemes, e.g., RGB, and that controls device color lookup tables LUTs that may be updated to reflect changes that adjust the output of a printing system to correct for detected defects; and a detection/correction processing module 142 that controls the application of one or more print quality defect detection/correction processes that analyze image defect log data and/or system environment log data using, for example, interpolation techniques to identify and correct print quality defects. Exemplary interpolation techniques may produce, for example, one or more color correction matrix transformations and/or one or more color correction polynomial fittings, and/or other color space transformation and/or other image quality defect compensating output.

In operation, each of the above-described modules/controllers executed by processor 104 may maintain a workflow state machine, and/or control parameters that allow the module to perform its assigned task. For example, print controller 128 may maintain a work-flow, state machine, and/or control parameters that allows print controller 128 to coordinate the functions performed by other modules/controllers executed by processor 104 to implement a print job and to perform print quality defect detection and correction.

For example, print controller 128 may contain a set of control parameters that allows it to initiate the performance of specific actions by each of the other modules/controllers executed by processor 104 in accordance with (1) a print job work-flow dictated by operator provided print job image sources and/or control parameters and (2) predefined processes for the collection of image data suitable to support print quality defect detection/correction and (3) predefined processes for the subsequent processing of the collected data to identify and/or correct image defects. Each module/controller executing an assigned task may provide print controller 128 with status updates, e.g., indicating the completion of an assigned task, thereby allowing print controller 128 to orchestrate activities performed by the respective modules/controllers in series and/or in parallel to expedite the smooth and efficient execution of a print job and the efficient detection/correction of print quality defects.

Figure 2:
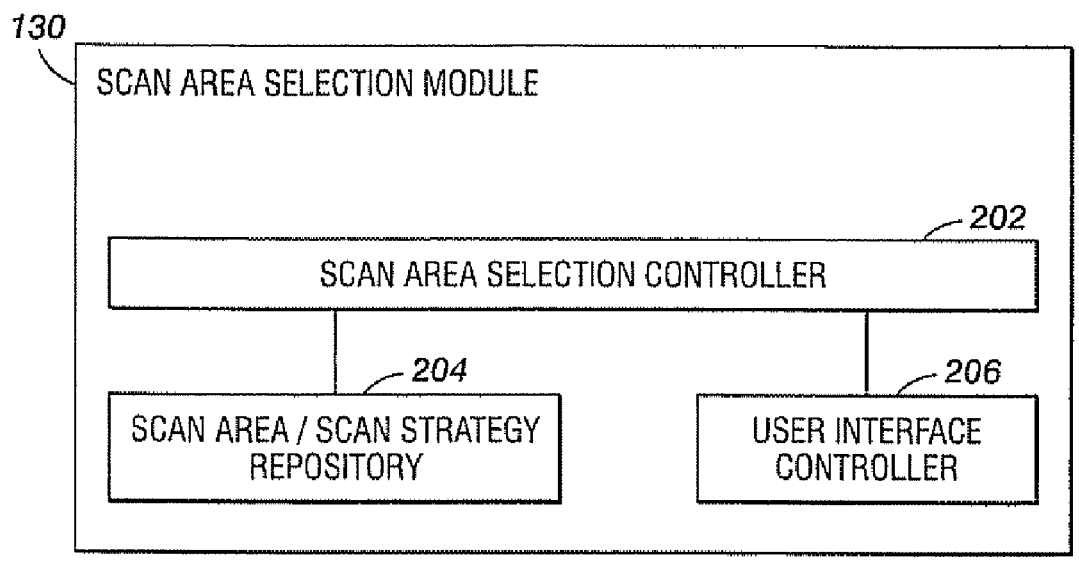
FIG. 2 is a module level block diagram of an exemplary scan area selection module presented in FIG. 1.

FIG. 2 is a module level block diagram of an exemplary scan area selection module 130 described above with respect to FIG. 1. As shown in FIG. 2, scan area selection module 130 may include a scan area selection controller 202, a scan area/scan strategy repository 204, and a user interface controller 206.

Scan area selection controller 202 may control overall operation of scan area selection module 130 by communicating with print controller 128, and/or other modules within printing system 100, to receive information required for the formation of scan areas and scan area strategies that may produce sufficient image data to support print quality defect detection and correction processes described below.

Scan area/scan strategy repository 204 may store predefined regions, or scan areas, from which image data may be collected from one or more of a source image and a rendered image of a registered source image/rendered image pair. For example, as described in greater detail below, the described approach allows image data to be collected from one or more scan areas for each image, or page, processed by the printing system. The defined set of scan areas and the order in which each scan area is processed to collect data may be referred to as a scan strategy. Scan strategies may be specifically tailored to retrieve reduced amounts of image data from individual pages processed by printing system 100. By reducing the amount of image data collected for each page, the volume of data collected and stored is reduced, allowing data to be collected for analysis corresponding to a variety of pixel colors under a variety of system status/system environment conditions, while not adversely impacting printing system page-per-minute throughout and without requiring exorbitant impact on data storage overhead.

The described approach, in which colorant data may be collected from multiple images over time allows a variety of defect detection processing approaches to be used to detect a variety of types of printing system defects. As addressed above, such printing system defects may be the result of multiple contributing factors, and each of these factors may vary over time in response to changing conditions. For example, factors related to colorant interactions such as transfer roller pressures, manufacturing tolerances, belt tensions, print-head-to-print-media spacing variations, thickness/surface characteristics of paper stock used, environmental temperatures/humidity, may manifest themselves as spatially incoherent colorant defects. Further, factors related to colorant interactions such as wear, dirt, toner consumption, spatially dependent variations in charge, development field, cleaning field, toner concentration, raster output, raster output power, and/or roller pressure variations, may manifest as spatially coherent colorant defects.

By allowing image data to be collected from multiple pages, over time, changes in, for example, colorant defects may be analyzed over time in view of chances in system status and environmental conditions that may contribute to the colorant defects. In this manner, root causes contributing to the colorant defects may be identified, and those contributing factors that cannot be eliminated, e.g., through line replacement unit (LRU) repairs, routine maintenance, etc., maybe accommodated using, for example, one or more interpolation techniques, that may produce, for example, updates to one or more printing system device dependent color correction LUTs, produce/refine one or more color correction matrix transformations and/or produce/refine one or more color correction polynomial fittings. Such color space transformation/defect compensation techniques may be tailored for specific printing system status/printing system environment conditions and/or specific page image regions.

User interface controller 204 may present a user interface that allows a printing system operator to define and/or adjust scan areas/scan strategies to better support existing image quality defect analysis processes, and/or to support a newly introduced defect analysis process. For example, user interface controller 204 may present a user with a view of a source image data and/or rendered image data and allow the printing system operator to identify regions within source image view and/or rendered image view that suffer from image quality defects, based on the printing system operator's visual inspection of a printed copy of the rendered image view.

Once one or more defect containing regions are identified by the printing system operator, user interface controller 204 may generate and present via the user interface a suggested set of scan areas corresponding to the regions identified, and may generate a proposed scan strategy for collecting data from source image/rendered image pairs using the scan areas. User interface controller 204 may present performance impact assessments regarding, for example, memory requirements associated with the suggested scan areas/scan scenarios and/or estimates of any degradation in printing system page-per minute performance associated with the proposed scan areas/scan scenario. The print system operator may accept, via the user interface the proposed scan areas/scan scenario and/or may specify a constraint, e.g., a maximum allowed storage and/or a maximum added delay in printing system page-per minute performance, and thereby cause user interface controller 204 to generate and present another set of proposed scan areas/scan scenarios for consideration by the printing system operator.

Figure 3:
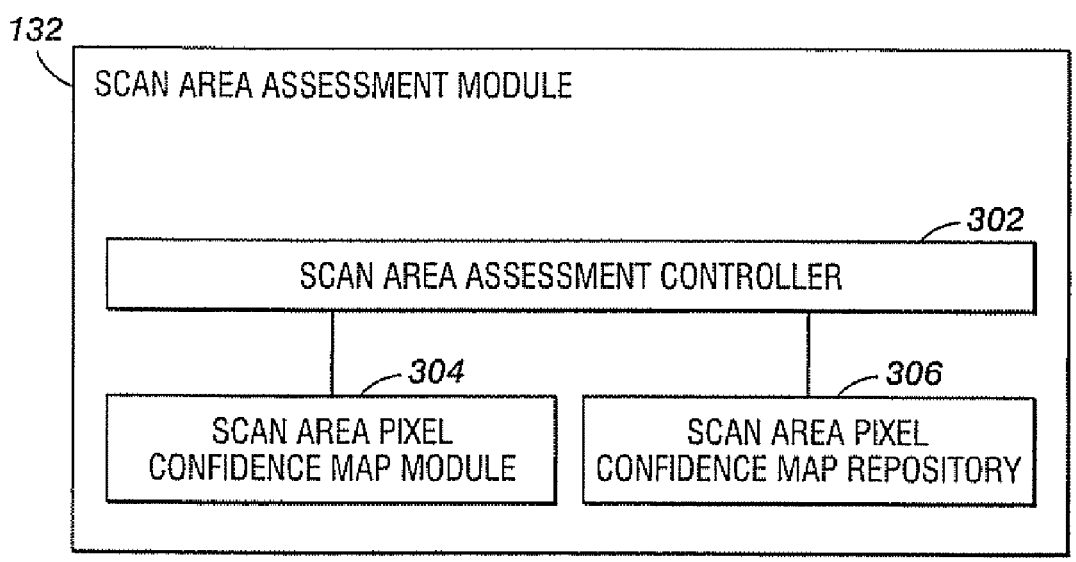
FIG. 3 is a module level block diagram of an exemplary scan area assessment module presented in FIG. 1.

FIG. 3 is a module level block diagram of an exemplary scan area assessment module 132 described above with respect to FIG. 1. As shown in FIG. 3, scan area assessment module 132 may include a scan area assessment controller 302, a scan area pixel confidence map module 304, and scan area pixel confidence map repository 306.

Scan area assessment controller 302 may control overall operation of scan area assessment module 132 by communicating with print controller 128, and/or other modules within printing system 100, to make information requests, receive instructions and/or to exchange status and control parameters. Further, scan area assessment controller 302 may coordinate activities performed by scan area pixel confidence map module 304 and scan area pixel confidence map repository 306 in a manner consistent with received instruction and received status and control parameters.

Scan area pixel confidence map module 304 may, at the request of scan area assessment controller 302, assess the pixels in a source image scan area to produce a scan area pixel confidence map. The scan area pixel confidence map may contain a confidence value for each pixel in the scan area that provides a measure of whether the individual pixel is a good candidate use in performing print quality defect detection. For example, in one exemplary embodiment, pixels surrounded by pixels of the same color may be considered better candidates for use in performing print quality defect detection analysis than pixels that are surrounded partially or completely by pixels of a different color. One exemplary scan area pixel confidence map may contain a confidence value for each pixel based on an assessment of the surrounding pixels. For example, a pixel surrounded entirely by pixels of the same color may receive a higher confidence rating higher than a pixel only partially surrounded by pixels of the same color. Another exemplary scan area pixel confidence map may contain a cumulative confidence value for each pixel based on a combination of assessment criteria, e.g., color of the pixel, color of surrounding pixels, whether the pixel is on the edge of the scan area, etc. In another exemplary embodiment a pixel confidence rating may be based on the standard deviations on CMYK of its neighboring pixels. One approach may be to give greater weight to pixels that are in flats regions of the images and to give less weight to areas that are busy, and therefore more susceptible to source image/rendered image registration errors. For example, a standard deviation of zero would indicate that the surrounding pixels are of the same color and a high confidence may be assigned; whereas a large standard deviation would indicate that the surrounding pixels are different and a low confidence may be assigned.

Scan area pixel confidence map repository 306 may, at the request of scan area assessment controller 302, store scan area pixel confidence maps for later use. For example, scan area confidence maps based on scan areas from a common source image may be associated with a common page identifier and scan area identifier to facilitate retrieval of scan area confidence maps to support print quality defect detection analysis. Scan area pixel confidence map repository 306 may transmit scan area confidence maps individually based on the page identifier/scan area identifier or in page sets based on the page identifier alone, upon request from other modules within printing system 100. In one exemplary embodiment a page identifier may allow the scan area confidence maps associated with a common page to be associated with datestamp/timestamp information and hence date/time relevant environmental information may be associated with the page image data, as addressed in greater detail below. In another exemplary embodiment, the generated pixel confidence values may be stored within an exemplary pixel color defect log in association with each logged pixel color defect, as shown below in Table 1.

Figure 4:
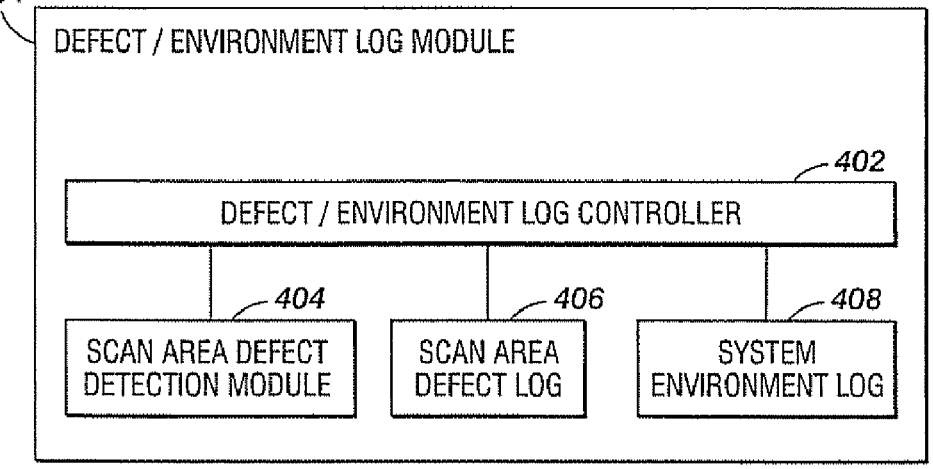
FIG. 4 is a module level block diagram of an exemplary defect/environment log, module presented in FIG. 1.

FIG. 4 is a module level block diagram of an exemplary defect/environment log module 134 described above with respect to FIG. 1. As shown in FIG. 4, defect/environment log module 134 may include a defect/environment log controller 402, a scan area defect detection module 404, a scan area defect log 406, and a system environment log 408.

Defect/environment log controller 402 may control overall operation of defect/environment log module 134 by communicating with print controller 128, and/or other modules within printing system 100, to make information requests, receive instructions and/or to exchange status and control parameters. Further, defect/environment log controller 402 may coordinate activities performed by scan area defect detection module 404, scan area defect log 406, and system environment log 408 in a manner consistent with received instruction and received status and control parameters.

Scan area defect detection module 404 may, at the request of scan area assessment controller 402, process a scan area to compare pixel color data in a source image scan area with pixel color data in a corresponding rendered image scan area to identify pixel level color defects. Detected pixel color defects may be stored in scan area defect log 406 as each pixel color defect is detected. In one exemplary embodiment, a detected pixel color defect may be stored in scan area defect log 406 in association with a page identifier, a scan area identifier, and a pixel identifier that together uniquely identify the pixel. In another exemplary embodiment, a datestamp/timestamp may be stored in scan area defect log 406 in place of, or in addition to, each page identifier.

System environment log 408 may store system environment and system status parameters related to operation of printing system 100. For example, system environment parameters related to operation of printing system 100 may include operating temperatures at various pre-selected locations within printing system 100, the ambient humidity, etc. System status parameters related to operation of printing system 100 may include such information as the level of toner in respective print engine toner cartridges, the age of the toner in the respective print engine toner cartridges, type of paper stock in use, etc. In one exemplary embodiment system environment and system status parameter entries may be stored in system environment log 408 in association with a datestamp/timestamp that allows system environment and system status parameters to be correlated with pixel color defects stored in scan area defect log 406. In another exemplary embodiment system environment and system status parameter entries may be stored in system environment log 408 in association with a pace identifier that allows system environment and system status parameters to be correlated with pixel color defects stored in scan area defect log 406.

Table 1 presents exemplary pixel defect log entries that may be stored in an exemplary scan area defect log 406. As shown in Table 1, an exemplary pixel defect log entry may include pixel identification information, source image pixel color data, and source image/rendered image pixel color difference data. For example, pixel identification information may include a page identifier (p), pixel confidence measure (q), pixel row identifier (i) and pixel column identifier (j). Pixel row identifier (i) and pixel column identifier (j) may represent pixel locations with respect to rows and columns within the identified page (p). Assuming that a CYMK color scheme is in use, source image pixel color data may include a source image pixel cyan component value (c), a source image pixel magenta component value (m), a source image pixel yellow component value (y) and a source image pixel black component value (k). Further, source image/rendered image pixel color difference data may include a source image pixel/rendered image pixel cyan component difference ($\Delta c$), a source image pixel/rendered image pixel magenta component difference ($\Delta m$), a source image pixel/rendered image pixel yellow component difference ($\Delta y$) and a source image pixel/rendered image pixel black component difference ($\Delta k$).

TABLE 1

Exemplary Defect Log Table

| p | q | i | j | c | m | y | k | $\Delta c$ | $\Delta m$ | $\Delta y$ | $\Delta k$ |
|---|---|---|---|---|---|---|---|---|---|---|---|
| 1 | .5 | 1 | 1 | 100 | 100 | 0 | 0 | 2 | −3 | 0 | 0 |
| 1 | .7 | 1 | 2 | 0 | 100 | 20 | 60 | 0 | −2 | 2 | 5 |
| 2 | .3 | 1 | 1 | ... | ... | ... | ... | ... | ... | ... | ... |
| ... | ... | ... | ... | ... | ... | ... | ... | ... | ... | ... | ... |

The pixel defect log entries shown in Table 1 are exemplary only. For example, in a print quality defect detection approach that uses scan areas, as described above, each entry may further contain a scan area identifier that identifies a unique scan area within the page, and the pixel row identifier (i) and pixel row identifier (j) may represent pixel locations with respect to rows and columns within the identified scan area. Further, as described above, each entry may farther contain a datestamp/timestamp that allows each entry to be correlated with system environment data stored in system environment log 408. In some embodiments the page identifier, which may be unique and incremented by 1 as each successive page is processed by printing system 100, may serve in place of a datestamp/timestamp to correlated pixel defect log entries with system environment data stored in system environment log 408.

As described with respect to FIG. 2, above, and FIG. 13, below, pixel data may be collected using multiple scan scenarios, each scan scenario including one or more scan areas. In such exemplary embodiments, the exemplary pixel defect log entries shown in Table 1 may each be amended to include a unique scan scenario identifier and a unique scan area identifier, or similar identifiers, so that pixel defect log entries may be sorted and may be retrieved for delivery to a print quality defect detection processing module based, for example, on the scan scenario with which the pixel defect log entries are associated.

Figure 5:
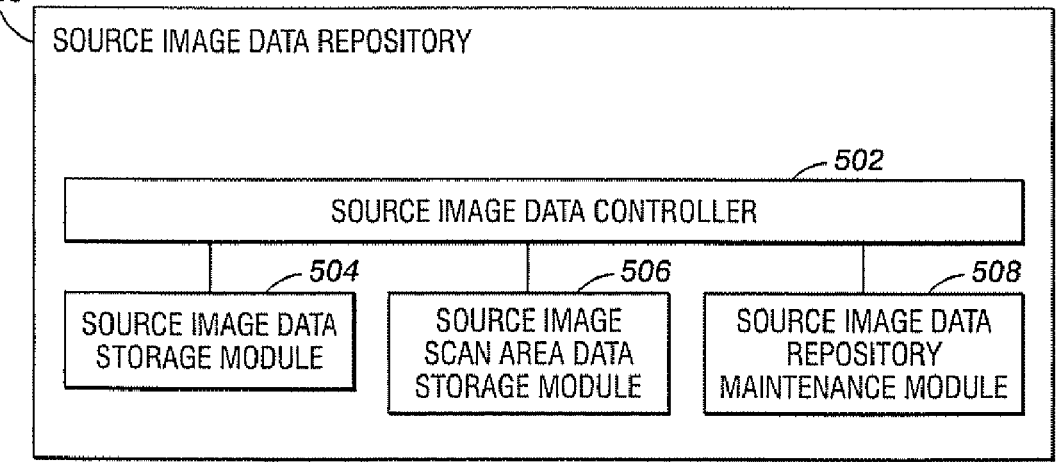
FIG. 5 is a module level block diagram of an exemplary source image data repository presented in FIG. 1.

FIG. 5 is a module level block diagram of an exemplary source image data repository 136 described above with respect to FIG. 1. As shown in FIG. 5, source image data repository 136 may include a source image data controller 502, a source image data storage module 504, a source image scan area data storage module 506, and a source image data repository maintenance module 508.

Source image data controller 502 may control overall operation of source image data repository 136 by communicating with print controller 128, and/or other modules within printing system 100, to make information requests, receive instructions and/or to exchange status, data and status and/or control parameters. Further, source image data controller 502 may coordinate activities performed by source image data storage module 504, source image scan area data storage module 506, and source image data repository maintenance module 508 consistent with received instructions, data and status and/or control parameters.

Source image data storage module 504 may, at the request of print controller 128 via source image data controller 502, store source image data generated by source imaging device 114 or received via network interface 122 from a network connected source image device, such as a network connected scanner, a DFE processor, a network connected workstation and/or a network connected storage device.

Source image scan area data storage module 506 may, at the request of print controller 128 via source image data controller 502, store source image data associated with page scan areas within the source image, as described above with respect to scan area selection module 130. Using such an approach, the source image data that is stored to support print quality defect detection may be greatly reduced. For example, once a source image is printed the source image data stored in source image data storage module 504 may be deleted. Depending on the number and size of scan areas selected within the page, the volume of source image data stored in source image scan area data storage module 506 may represent only a fraction of the original source image data stored in source image data storage module 504.

Source image data repository maintenance module 508 may be responsible for purging image data from source image data storage module 504 and/or source image scan area data storage module 506 in accordance with a predefined, or user defined, source image data maintenance policy. For example, source image data repository maintenance module 508 may routinely parse source image data storage module 504 and/or source image scan area data storage module 506 to expunge older image data, e.g., image data associated with an old page identifier, or image data associated with an old datestamp/timestamp. The source image data maintenance policy that controls when older data is deleted may be driven by one or more factors such as the storage capacity of source image repository 136 and/or data age constraints imposed by a printing system operator.

Figure 6:
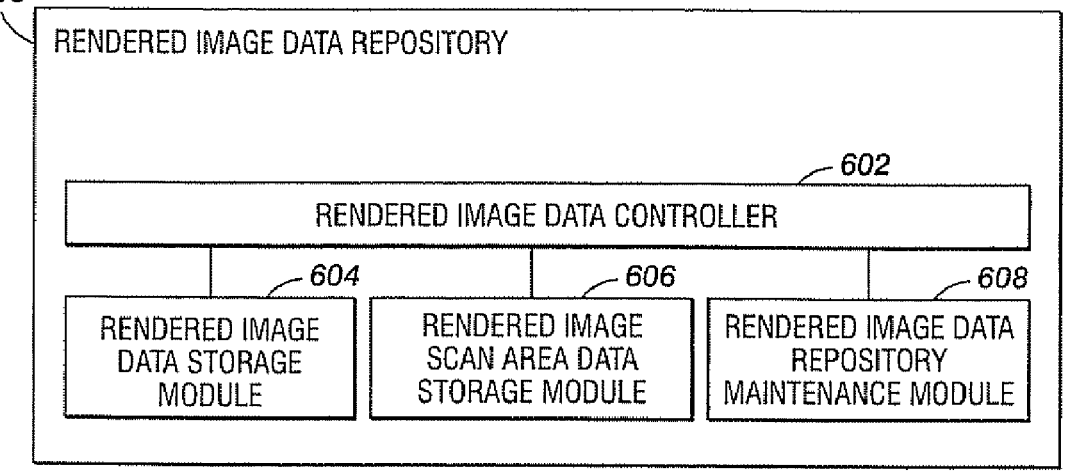
FIG. 6 is a module level block diagram of an exemplary rendered image data repository presented in FIG. 1.

FIG. 6 is a module level block diagram of an exemplary rendered image data repository 138 described above with respect to FIG. 1. As shown in FIG. 6, rendered image data repository 138 may include a rendered image data controller 602, a rendered image data storage module 604, a rendered image scan area data storage module 606, and a rendered image data repository maintenance module 608.

Rendered image data controller 602 may control overall operation of rendered image data repository 138 by communicating with print controller 128, and/or other modules within printing system 100, to make information requests, receive instructions and/or to exchange status, data and/or control parameters. Further, rendered image data controller 602 may coordinate activities performed by rendered image data storage module 604, rendered image scan area data storage module 606, and rendered image data repository maintenance module 608 in a manner consistent with received instructions, data and status and/or control parameters.

Rendered image data storage module 604 may, at the request of print controller 128 via rendered image data controller 602, store rendered image data generated by output imaging device 120, as described above with respect to FIG. 1. For example, output imaging device 120 may be a camera, a scanner, a CCD array, a scanning calorimeter, or any other known or hereafter developed device capable of capturing electronic rendered image data from a rendered image hard-copy.

Rendered image scan area data storage module 606 may, at the request of print controller 128 via rendered image data controller 602, store rendered image data associated with page scan areas within the rendered image, as described above with respect to scan area selection module 130. Using such an approach, the rendered image data that is stored to support print quality defect detection may be greatly reduced. For example, once rendered image scan area data is retrieved and stored in rendered image scan area data storage module 606, the rendered image data stored in rendered image data storage module 604 may be deleted. Depending on the number and size of scan areas selected within the page, the volume of rendered image data stored in rendered image scan area data storage module 606 may represent only a fraction of the original rendered image data stored in rendered image data storage module 604.

Rendered image data repository maintenance module 608 may be responsible for purging image data from rendered image data storage module 604 and/or rendered image scan area data storage module 606 in accordance with a predefined, or user defined, rendered image data maintenance policy. For example, rendered image data repository maintenance module 608 may routinely parse rendered image data storage module 604 and/or rendered image scan area data storage module 606 to expunge older data, e.g., image data associated with an old page identifier, or image data with an old datestamp/timestamp. The rendered image data maintenance policy that controls when older data is deleted may be driven by one or more factors such as the storage capacity of rendered image repository 138 and/or data age constraints imposed by a printing system operator.

Figure 7:
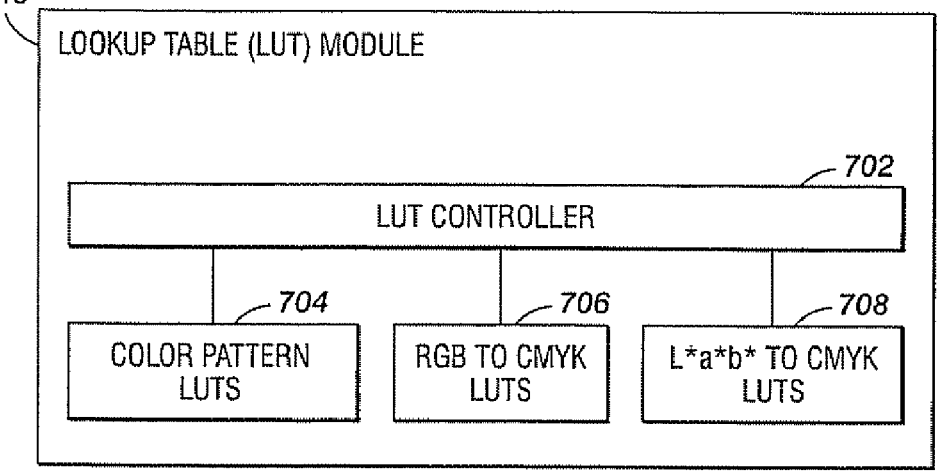
FIG. 7 is a module level block diagram of an exemplary lookup table module presented in FIG. 1.

FIG. 7 is a module level block diagram of an exemplary look-up table (LUT) module 140 described above with respect to FIG. 1. LUT module 140 may include any number of lookup tables needed to convert pixel color data from one color scheme to another. Such conversions may be needed based on the output format supported by respective source imaging devices and output imaging devices 120, and the need to convert from device dependent formats to device independent formats in support of print quality defect detection and correction processes. For example, as shown in FIG. 7, LUT module 140 may include LUT controller 702, color pattern LUTS 704, RGB-to-CMYK LUTS 706 and L*A*B* to CYMK LUTS 708.

LUT module controller 702 may control overall operation of LUT module 140 by communicating with print controller 128, and/or other modules within printing system 100, to receive and respond to requests for image data conversions. Depending on the nature of the conversion required, LUT module controller 702 may access the required one or more LUT tables in LUT module 140 to accommodate the conversion request.

As described above, by allowing image data to be collected from multiple pages, over time, changes in, for example, colorant defects may be analyzed over time in view of changes in system status and environmental conditions that may contribute to the colorant defects. In this manner, defects related to colorant interactions and root causes contributing to other colorant defects may be identified, and those contributing factors that cannot be eliminated, e.g., through line replacement unit (LRU) repairs, routine maintenance, etc., maybe accommodated using, for example, one or more interpolation techniques, that may produce, for example, updates to one or more printing system device dependent color correction LUTs, produce/refine one or more color correction matrix transformations and/or produce/refine of one or more color correction polynomial fittings. Such color space transformation/defect compensation techniques may be tailored for specific printing system status/printing system environment conditions and/or specific page image regions. For example, one or more printing system colorant LUTs may be updated to include color updates to correct print quality defects identified using one or more of the print quality defect detection analysis modules described, for example, with respect to FIG. 8. Such color adjustments may be stored in one or more color pattern LUTs 704 along with header information that may be used to store information regarding the system status/system environment conditions under which each of the respective LUTS may be used to reduce image quality defects.

Figure 8:
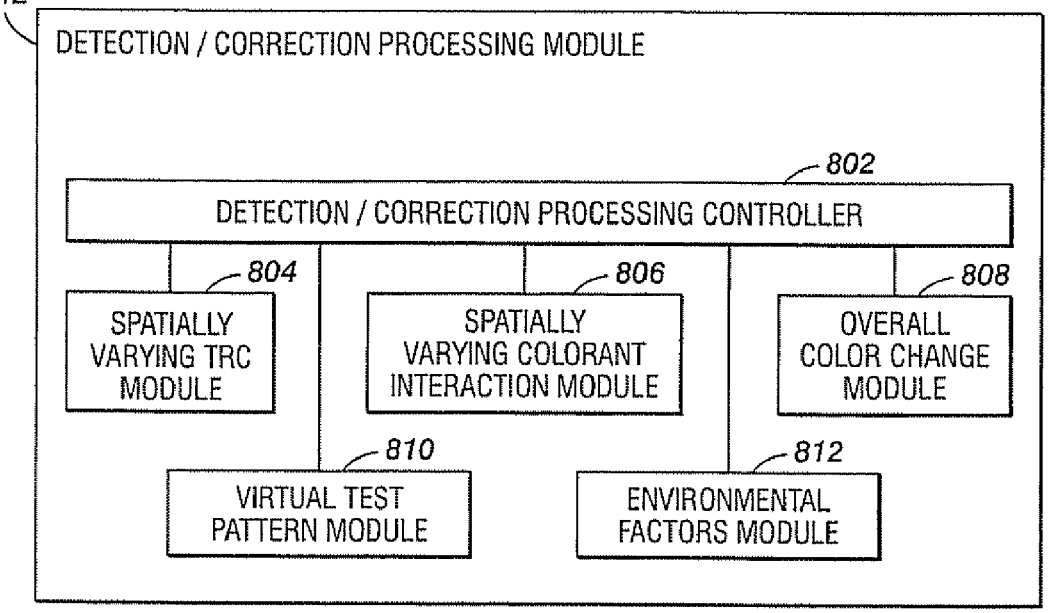
FIG. 8 is a module level block diagram of an exemplary processing module presented in FIG. 1.

FIG. 8 is a module level block diagram of a detection/correction processing module 142 described above with respect to FIG. 1. As shown in FIG. 8, detection/correction processing module 142 may include a detection/correction processing controller 802, a spatially varying TRC module 804, a spatially varying colorant interaction module 806, an overall color change module 808, a virtual test pattern module 810 and an environmental factors module 812.

Detection/correction processing controller 802 may control overall operation of detection/correction processing module 142 by communicating with print controller 128, and/or other modules within printing system 100, to coordinate flows of image defect data appropriate for each of the respective print quality defect detection and correction processes. Operation of each of spatially varying TRC module 804, spatially varying colorant interaction module 806, overall color change module 808, virtual test pattern module 810 and environmental factors module 812 are described in greater detail below.

The exemplary print quality defect detection and correction processes described below are described with respect to an exemplary 4-color printing configuration, e.g., CYMK, in which four colors, i.e., N=4, are used. However, other embodiments may be configured to support other N-color printing configurations in which more or less than four colors, i.e., N>4 or N<4, are used. In such embodiments, the pixel color defect log entries may contain original color and color error data for each of the respective colors in the N-color system. In such N-color system embodiments, the data collection and storage approach described above, as well as the print quality defect detection and correction processes, described below, remain the same; however, in an N-color embodiment, rather than 4 colorants, N-colorant data is collected, and N-colorant data is processed using the processing techniques described below for N=4 embodiments.

In an exemplary embodiment of spatially varying TRC module 804, pixel defect log entries contained in scan area defect log may be retrieved for a single row (i), from an entire image page, or from a scan area within an image page, and row coherent errors in colorant (c) may be identified using a moving matrix interpolation method using:

$$w_t = \frac{1}{\|\bar{x}\|^\alpha + \varepsilon}, \quad (1)$$

as the weighting in formulating the weighted least squares problem,
where x=[p, q, Δc, Δm, Δy, Δk], where p may be the datestamp/timestamp for the pixel and q may be a measure of a confidence based on the pixel confidence rating stored for the pixel contained in its respective scan area pixel confidence map;

Δc, Δm, Δy, Δk are each a source image pixel/rendered image pixel component difference for the respective color components of the printing system;

$\|\cdot\|$ is a vector norm (such as 1-norm, 2-norm, etc.); and

α and ε control the smoothness and localization of the interpolation

The approach differs from the spatially varying TRC described in U.S. patent application Ser. No. 10/992,726 ('726), incorporated by reference above, by replacing the polynomial fitting used in '726 with moving matrix interpolation, and the introduction of the additional information provided by x=[p, q, Δc, Δm, Δy, Δk], such as the additional information provided by pixel confidence measure, q. Note that the interpolation may be performed using the full range of c, using equal spacing sampling, for example, e.g., 256 equal spaced samples, where c=0~255.

In an exemplary embodiment of spatially varying colorant interaction module 806, row colorants interaction errors may be identified, for example, by first retrieving pixel defect log entries contained in scan area defect log 406 for a single row (i), from an entire image page, or from a scan area within an image page, and using a moving matrix interpolation method, again using:

$$w_t = \frac{1}{\|\bar{x}\|^\alpha + \varepsilon}, \quad (1)$$

as the weighting in formulating the weighted least squares problem,
where x=[p, q, Δc, Δm, Δy, Δk], where p may be the datestamp/timestamp for the pixel and q may be a measure of a confidence based on the pixel confidence rating stored for the pixel contained in its respective scan area pixel confidence;

Δc, Δm, Δy, Δk are each a source image pixel/rendered image pixel component difference for the respective color components of the printing system;

‖•‖ is a vector norm (such as 1-norm, 2-norm, etc.); and
α and ε control the smoothness and localization of the interpolation.

Using the above approach, the interpolation may be performed on a set of CMYK combinations. In particular, colorant interactions are most significant in high area coverage. Therefore, the CYMK combinations of interest may focus on pixels where toner coverage, c+m+y+k, in the source image data is high, for example, where c+m+y+k>T %, where T is approximately 120%, for example, where c=60% and m=60%, y=0%, k=0%, or equivalently, a total digital count of 306, i.e., 255*120%. Therefore, scan area pixel confidence map used to select pixels for use in performing the above defect analysis process, as described with respect to FIG. 2 may assigned confidence ratings to pixels based on such criteria.

Note that in some printing systems there may be little or no retransfer problem with respect to K toner, since K is the first toner station in the printing process. In such case, k can be removed in the above example, i.e., the process may focus on pixels with c+m+y>T % for example. Further, in most printing systems the toner color associated with the first toner station in the printing system does not experience retransfer distortion. Therefore, the toner color that is associated with the first toner station in the printing process may be disregarded from the above spatially varying colorant interaction analysis.

In an exemplary embodiment of overall color change module 808, once again, row colorants interaction errors may be identified, for example, by first retrieving pixel defect log entries contained in scan area defect log 406 for a single row (i), from an entire image page, or from a scan area within an image page. The intended colorants cmyk may be mapped to the intended Lab through the printer model such as cmyk-to-Lab LUT and the resulting (c+Δc, m+Δm, y+Δy, k+Δk) may be mapped to the resulting L'a'b'. The color difference ΔE between Lab and L'a'b' would be zero if the printer perform accurately (no color changes over time) but often this is not the case. Based on the type of data received, a pLab→ΔE conversion may be performed or a pcmyk→ΔE conversion may be performed based on the formatting of the received data. This error information may be used to detect the color changes of the printer and identify the area in color space where the color error is the most.

In the above description q may be a measure of confidence that colorant error is a true colorant error, and may be retrieved from the scan area pixel confidence map for the scan area with which the pixel is associated. As described above with respect to FIG. 3, and below with respect to FIG. 11, the pixel confidence ratings may be determined using criteria tailored for the type of print quality defect detection analysis process with which the pixel confidence ratings is intended to be used. For example, such pixel confidence ratings may assign higher confidence rating to pixels from areas of uniform color within an image, and may assign lower confidence ratings to pixels from areas within an image that are highly diverse in pixel colors, e.g., where the chance is higher that a detected pixel color defect was actually caused by an inaccurate registration between the rendered image and its corresponding source image. Identifying areas where detected color errors are most significant, i.e. most accurate, greatly enhances the ability print quality defect detection analysis processes to reduce and eliminate color errors.

The processing techniques described above focus on color errors at various states [p, i, j, c, m, y, k]. Unfortunately, such techniques may not provide a direct indication of the goodness of customer-relevant image quality attributes such as streaks, bands, mottle, graininess etc. Therefore, an exemplary virtual test pattern module 810, may be used to create virtual prints, or patches, that may then be analyzed using any of the print quality defect detection analysis processes described above.

For example, a virtual red test patch at 50% area coverage of the size of 1 inch-square may be located at the top left corner of a page and a corresponding scan area/scan scenario may be defined to collect and store pixel defect log entries within the virtual red test patch. The pixel defect log entries then be processed to create the virtual red test patch via interpolation; and the virtual red test-patch may be further processed using any or all print quality defect detection/correction processes available to printing system 100 to assess the virtual test patch for mottle, graininess, streak, etc.

The print quality defect detection and correction processes described above, and/or other defect detection and correction processes, may be used to analyze logged image defect data. However, based on the defined scan areas and/or scan strategies in use, the image defect log may contain data that is not appropriate for use with each mid every defect detection and correction processes. Therefore, depending on the nature of the detection and correction process to be used, data within the image defect log may be pre-sorted prior to the analysis based on one or more criteria. For example, in some embodiments, only image defect data that meets a pre-defined criteria may be submitted to a specific defect detection and correction process. In this manner, defect data relevant to a specific type of image defect may be mined, i.e. filtered, from the image defect log data as a whole.

For example, image defect data may be filtered based on one or more of: a specific scan area within the respective pages; a specific source image pixel color; a range of source image pixel colors; a time period; a range of page sequence identifiers; a system status; and/or a range of printing system environment sensor values, prior to execution of a specific defect detection and correction process. In such a manner, image defect data relevant to the detection of a specific image defect, or type of defect, may be accumulated from the image defect log, thereby allowing a selected defect detection and correction process to analyze a specific image defect that a printing system operator wishes to correct.

In an exemplary embodiment of environmental factors module 812, any or all print quality defect detection/correction processes available to printing system 100, e.g., such as those described above may be iteratively executed based on image data collected under a range of varying print system environment and print system status conditions. The generated results may then be compared to each other and significant differences may be correlated with print system environment and print system status conditions at the time the color defect were produced. In this manner, print system environment and print system status conditions contributing to print quality defects may be identified and corrected. For example, changes in print system status conditions, such as the type of paper substrate onto which an image is placed, may affect the resulting printed image color. Further, changes in the print system environment, such as changes in humidity and temperature may affect streaking in a printed image.

Figure 9:
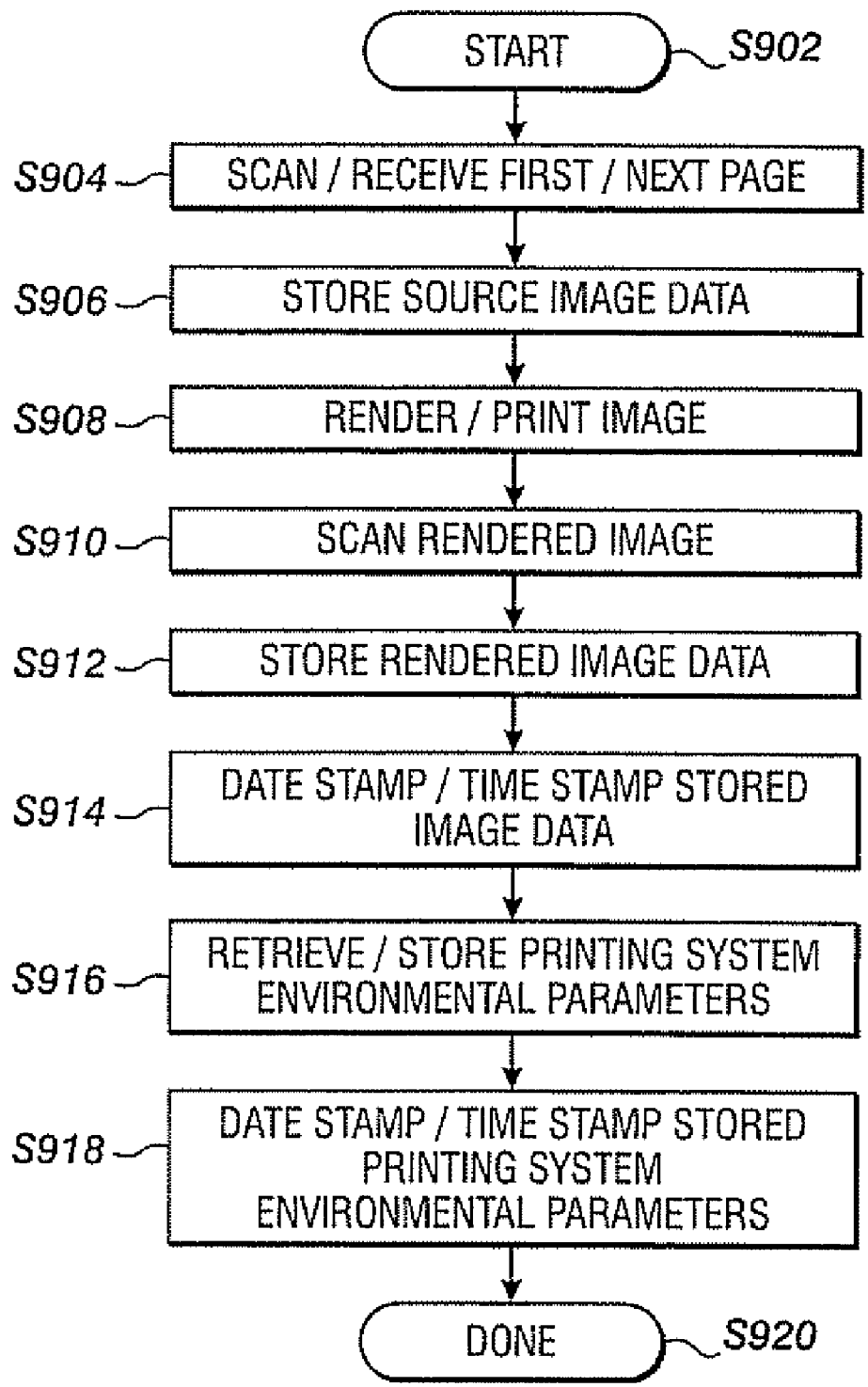
FIG. 9 is a flow diagram representing an exemplary method for controlling operation of a printing system that supports print quality defect detection.

FIG. 9 is a flow diagram representing an exemplary method for controlling the extraction of a single page of source image data and a corresponding page of rendered image data from the print system print cycles performed by printing system 100. In one exemplary embodiment, the process described below with respect to FIG. 9 may be repeated with for each page printed by printing system 100. In another exemplary embodiment, the process may be performed periodically in accordance with a predetermined sampling process. The process described below may be performed, for example, by print controller 128 working in conjunction with source image repository 136 and rendered image data repository 138. As shown in FIG. 9, the described process begins at step S902 and proceeds to step S904.

In step S904, the printing system scans/receives a first/next page of source image data, e.g., from one of source imaging device 114 and network interface 122, and operation of the method continues to step S906.

In step S906, the source image data may be stored, e.g., in source image data storage module 504 of source image repository 136, and operation of the method continues to step S908.

In step S908, print engine 118 may render/print a rendered image hardcopy of the source image data, and operation of the method continues to step S910.

In step S910, the rendered image hardcopy may be scanned, e.g., by output imaging device 120, to produce a page of rendered image data, and operation of the method continues to step S912.

In step S912, the rendered image data may be stored, e.g., in rendered image data storage module 604 of source image repository 138, and operation of the method continues to step S914.

In step S914, a datestamp/timestamp may be generated representing a time at which the rendered image was generated. In one exemplary embodiment, the datestamp/timestamp may be stored, for example, in system environment log 408 in association with a unique page identifier associated with a source image stored in source image data module 504 and a rendered image stored in source image data module 604. Once a datestamp/timestamp is generated and stored in association with stored source image data and stored rendered image data, operation of the method continues to step S916.

In step S916, current printing system status and/or environment data may be retrieved, and operation of the method continues to step S918.

In step S918, the printing system status and/or environment data may be stored, for example, in system environment log 408, in association with a page identifier associated with the stored page of source image data and the stored page of rendered image data and/or in association with datestamp/timestamp that allows the printing system status and/or environment data to be associated with the stored page of source image and/or the stored page of rendered image data. Once the printing system status and/or environment data has been stored in association with the stored page of source image data and/or the stored page of rendered image data, operation of the method jumps to step S920 and terminates.

Figure 10:
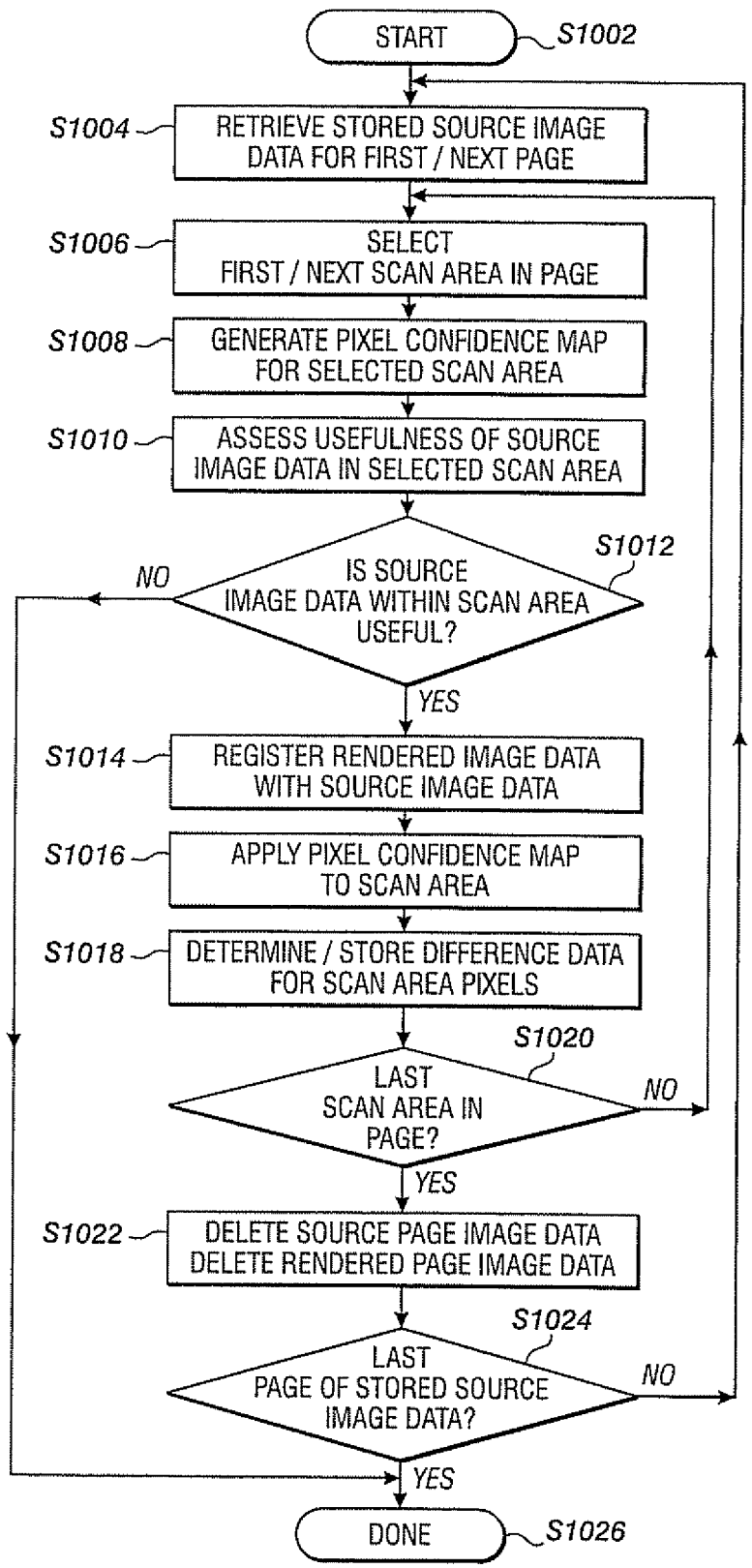
FIG. 10 is a flow diagram representing an exemplary method for processing stored image data to generate data for use in print quality defect detection analysis.

FIG. 10 is a flow diagram representing an exemplary method for generating scan area defect data from stored source image page data and stored rendered image page data. The process described below with respect to FIG. 10 maybe performed, for example, by defect/environment log module 134. For example, the process may be performed by defect/environment log controller 402 in conjunction with scan area defect detection module 404 and scan area defect log 406, working with source image page data retrieved from source image data storage module 504 and with rendered image page data retrieved from rendered image data storage module 604 and using scan area pixel confidence maps produced by scan area module 132, as described below with respect to FIG. 11. As shown in FIG. 10, the described process begins at step S1002 and proceeds to step S1004.

In step S1004, a first/next page of stored source image data may be retrieved, e.g., by defect/environment log controller 402 from source image data storage module 504, and operation of the method continues to step S1006.

In step S1006, a first/next scan area in the selected source image page may be selected, e.g., by defect/environment log controller 402 based on a scan area/scan scenario identified by scan area selection controller 202, and operation of the method continues to step S1008.

In step S1008, a pixel confidence map is generated for pixels within the selected scan area, e.g., by scan area pixel confidence map module 304 as described below with respect to FIG. 11, and operation of the method continues to step S1010. Note that the approach used to develop pixel confidence values may vary based on the print quality defect detection analysis processes, e.g., such as those described above with respect to FIG. 8, that the pixel confidence values are intended to support.

In step S1010, the usefulness of the scan area pixels for supporting one or more print quality defect detection analysis processes is determined based on, for example, an assessment of the scan area pixel confidence map. For example, in one exemplary embodiment the scan area image data may be considered useful if the number of pixels, with a pixel confidence rating above a first predetermined number, exceeds a second predetermined number. In another exemplary embodiment, if the combined pixel confidence rating for all pixels in the scan area exceeds a predetermined number, the scan area image data is determined to be useful. Once a determination as to the usefulness of the scan area image data has been determined, operation of the method continues to step S1012.

If, in step S1012, the source image scan area image data is found to be useful, operation of the method continues to step S1014, otherwise, operation of the method may proceed to step S1026 and the process terminates.

In step S1014, a page of rendered image data corresponding to the selected page of source image data, e.g., retrieved from rendered image data storage module 604, may be registered with the selected page of source image data, and operation of the method continues to step S1016.

In step S1016, the scan area pixel confidence map is applied to the scan area, thereby allowing pixel data with a pixel confidence rating below a predetermined threshold to be excluded from further processing, and operation of the method continues to step S1018.

In step S1018, a difference between the source image data pixel color data and the rendered image data pixel color data may be determined for source image/rendered image pairs not excluded by application of the pixel confidence map and the difference data for each pixel may be stored, for example, in scan area defect log 406, and operation of the method continues to step S1020.

If, in step S1020, the selected scan area is determined not to be the last scan area in the selected page, operation of the method returns to step S1006, otherwise, operation of the method continues to step S1022.

In step S1022, the page of source image data and the page of rendered image data may be deleted, e.g., from source image data storage module 504 and rendered image data storage module 604, respectively, to conserve storage resources, and operation of the method continues to step S1024.

If, in step S1024, the selected page of source image data is determined not to be the last pace of stored source image data, operation of the method returns to step S1004, otherwise, operation of the method continues to step S1026 and the process terminates.

Figure 11:
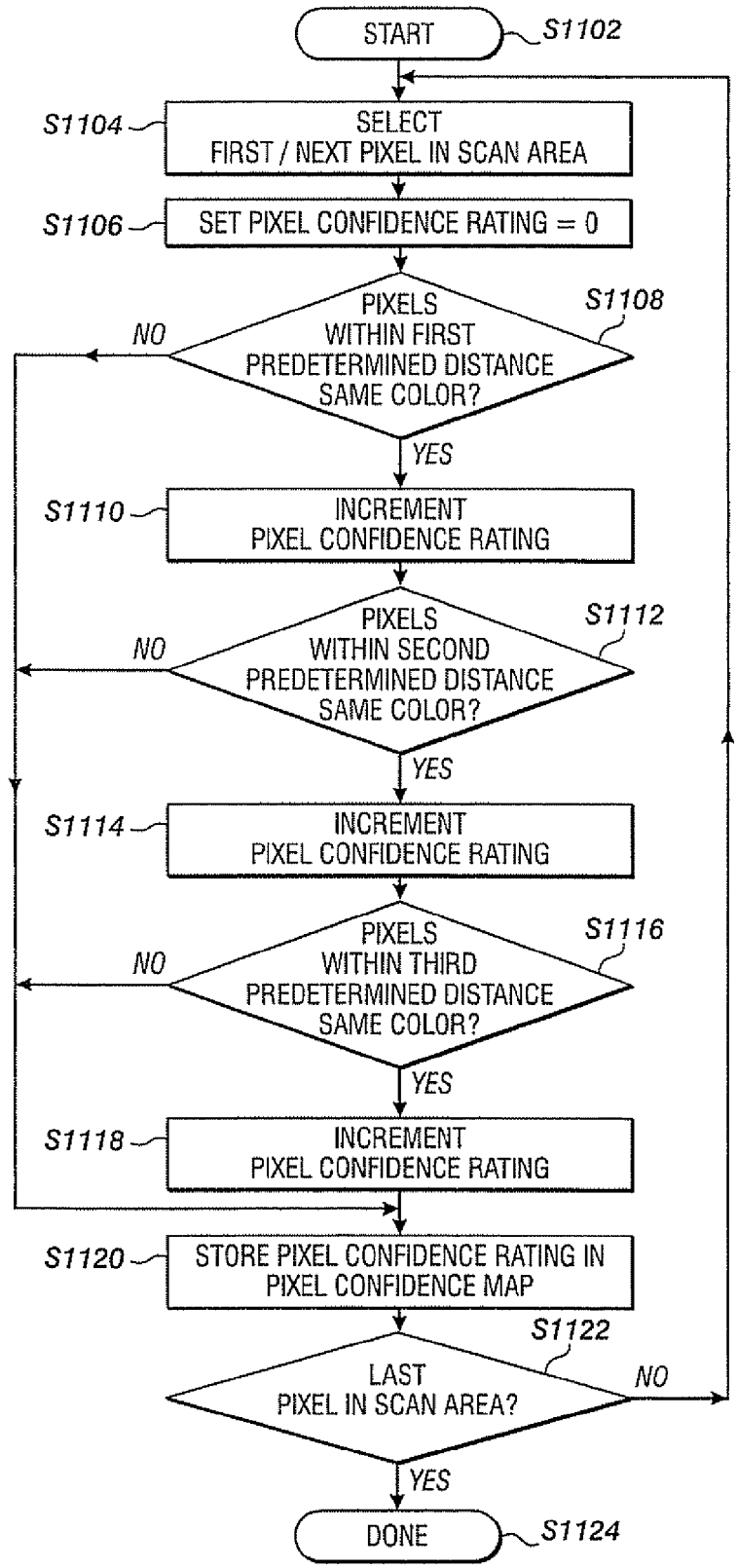
FIG. 11 is a flow diagram representing an exemplary method for generating a pixel confidence map.

FIG. 11 is a flow diagram representing an exemplary method for generating a scan area pixel confidence map that may be used to assess the usefulness of pixels in a selected scan area, as described above with respect to FIG. 10 at step S1008 and step S1010. The process described below with respect to FIG. 11 may be performed, for example, by scan area assessment module 132. For example, the process may be performed by scan area assessment controller 302 in conjunction with scan area pixel confidence map module 304 and scan area pixel confidence map repository 306, as described above with respect to FIG. 3. As shown in FIG. 11, the described process begins at step S1102 and proceeds to step S1104.

In step S1104, a first/next pixel may be selected from the current scan area, and operation of the method continues to step S1106.

In step S1106, the pixel confidence rating for the pixel may be initialized to 0, and operation of the method continues to step S1108.

If in step S1108, scan area pixel confidence module 304 determines that all pixels within a first predetermined distance from the currently selected pixel are of a similar color as the currently selected pixel, the method continues to step S1110, otherwise the method proceeds to step S1120.

In step S1110, the pixel confidence rating for the pixel may be incremented by a first increment, and operation of the method continues to step S1112.

If, in step S1112, scan area pixel confidence module 304 determines that all pixels within a second predetermined distance from the currently selected pixel are the same color as the currently selected pixel, the method continues to step S1114, otherwise the method proceeds to step S1120.

In step S1114, the pixel confidence rating for the pixel may be incremented by a second increment, and operation of the method continues to step S1116.

If in step S1116, scan area pixel confidence module 304 determines that all pixels within a third predetermined distance from the currently selected pixel are the same color as the currently selected pixel, the method continues to step S1118, otherwise the method proceeds to step S1120.

In step S1118, the pixel confidence rating for the pixel may be incremented by a third increment, and operation of the method continues to step S1120.

In step S1120, the scan area pixel confidence map may be stored, for example, in scan area pixel confidence map repository 306, and operation of the method continues to step S1122.

If, in step S1122, the selected pixel is determined not to be the last pixel in the scan area, operation of the method returns to step S1104, otherwise, operation of the method continues to step S1124 and the process terminates.

The process described above with respect to building a scan area pixel confidence map is exemplary only. For example, any approach, or combination of approaches, that produces a measure of confidence in the reliability of page image scan area pixel color values for use in one or more print quality defect detection processes may be used. For example, in one exemplary embodiment a pixel confidence rating may be based on a standard deviation of CMYK among a pixel's neighboring pixels. In such an exemplary embodiment, a standard deviation of zero would indicate that the surrounding pixels are of the same color and a high confidence may be assigned; whereas a large standard deviation would indicate that the surrounding pixels are different and a low confidence may be assigned. However, such measures of confidence may vary depending on the print quality defect detection analysis process with which the print image data is to be used. For example, for detecting color changes, a confidence map may measure how close a pixel's color is to the colors of its neighboring pixels; for background noise detection, a confidence map may measure how close the color of each pixel is to the paper substrate on which the rendered image is placed.

Figure 12:
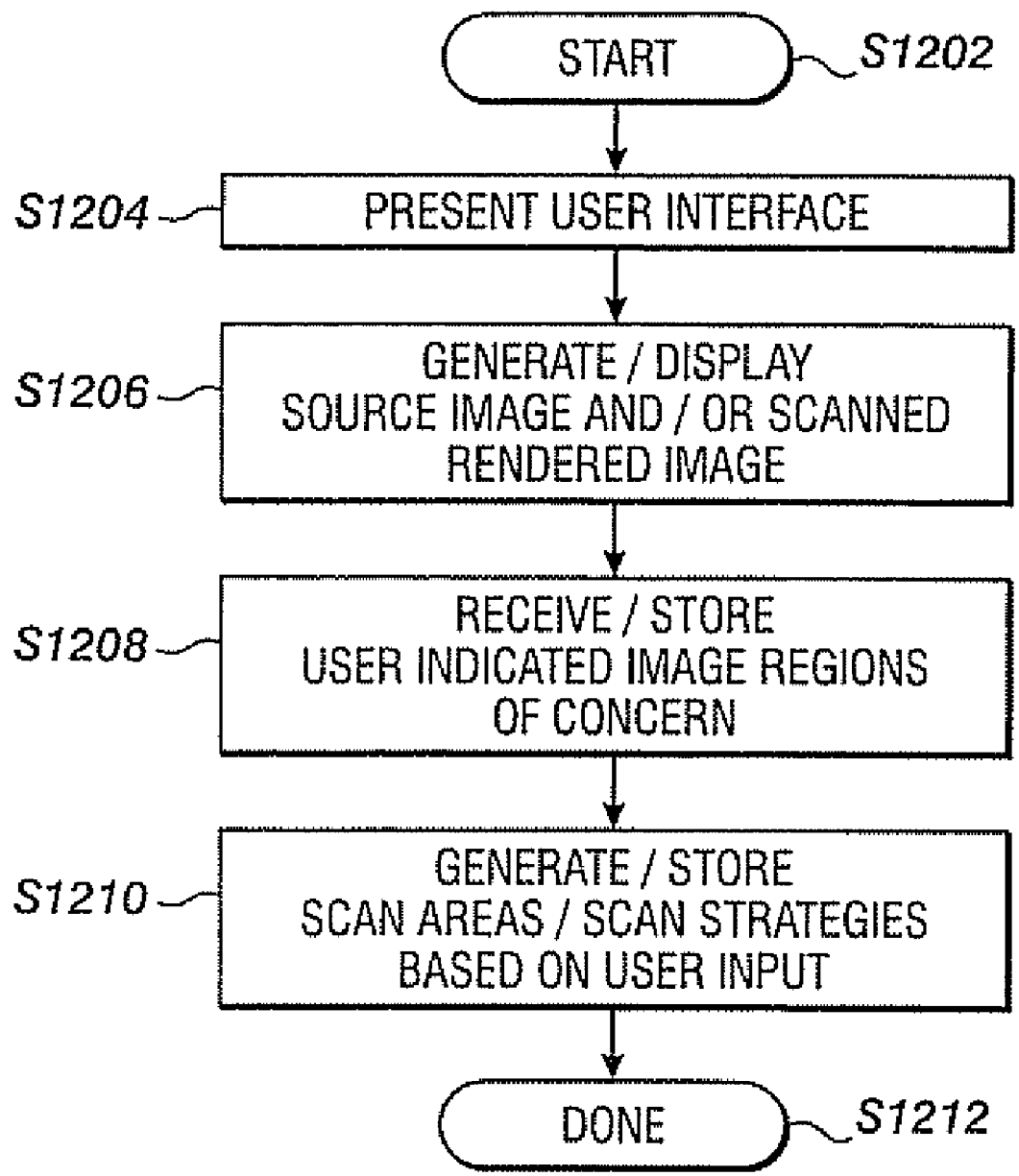
FIG. 12 is a flow diagram representing an exemplary method for generating scan areas based on user supplied input.

FIG. 12 is a flow diagram representing an exemplary method for allowing a printing system user to define page scan areas that include areas within a rendered image page that the user believes contain print quality defects. The process described below with respect to FIG. 12 may be performed, for example, by scan area section module 130. For example, the process may be performed by scan area selection controller 202 in conjunction with scan area/scan strategy repository 204 and user interface controller 206, as described above with respect to FIG. 2. As shown in FIG. 12, the described process begins at step S1202 and proceeds to step S1204.

In step S1204, scan area selection controller 202 may initiate user interface controller 206 in response to a request from a user, received via control panel/keyboard 112, indicating that the user wishes to define one or more scan areas for use is collecting print image data for use in print quality defect analysis, and operation of the method continues to step S1206.

In step S1206, user interface controller 206 may present a user interface that may include, for example, a view of a page of rendered image data, the page, for example, having been selected for use by the user from a current print job, and operation of the method continues to step S1208.

In step S1208, user interface controller 206 may receive from the printing system operator information identifying one or more areas within the displayed page of rendered image data that the printing system operator wishes to include in subsequent print quality defect analysis. For example, the user interface may allow the printing system operator to draw on the displayed page of rendered image data rectangular and/or circular borders for one or more proposed scan areas within the displayed page of rendered image data. Once the printing system operator indicates via the user interface that all scan areas have been identified, operation of the method continues to step S1210.

In step S1210, user interface controller 206 may define scan areas for subsequent use in collecting image data based on the regions defined by the printing system operator. If the printing system operator has indicated more than one scan region, user interface controller 206 may assign a scan order to the newly created scan areas. The one or more defined scan areas and scan order may be stored in scan area/scan strategy repository 204, and operation of the method continues to step S1212 and the process terminates. The defined set of scan areas and their respective scan order may be referred to as a scan strategy.

As described above with respect to FIG. 2, scan area/scan strategy repository 204 may store multiple scan strategies. For example, different scan strategies may be tailored to efficiently collect page data that may be used to support a specific type of print quality defect detection. For example, one scan strategy may be selected for supporting an analysis of text quality, whereas another scan strategy may be selected to support streak detection and suppression. The respective scan strategies may be applied individually, i.e., in series, and/or simultaneously, i.e., in parallel, as needed to collect the data required to support various print quality defect detection analysis processes. For example, one advantage of executing scan strategies in series is that the overhead associated with the collection of scan image data is reduced. However, one advantage of executing scan strategies in parallel is that data supporting a wide variety of print quality defect detection analysis processes may be based on page image data collected from a common set of page images.

Figure 13:
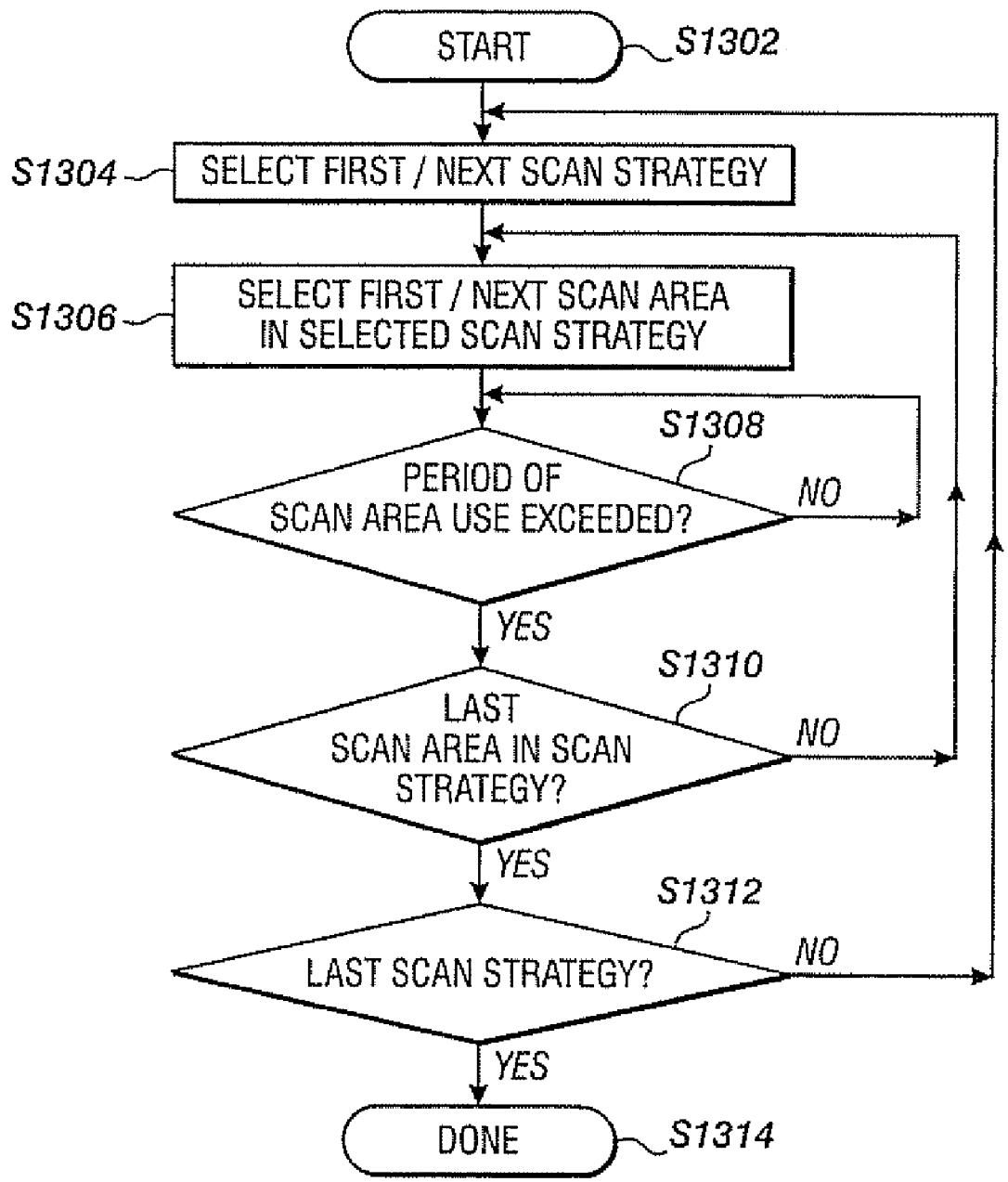
FIG. 13 is a flow diagram representing an exemplary method for selecting scan areas that support a variety of scan strategies.

FIG. 13 is a flow diagram representing an exemplary method for applying scan strategies stored in scan area/scan strategy repository 204 sequentially, each for a predetermined period, e.g., for a predetermined period of time, for a predetermined number of page images, etc. The process described below with respect to FIG. 13 may be performed, for example, in support of the process described above with respect to FIG. 10. For example, the first/next scan area in a page selected in step S1006 of FIG. 10, may vary based on the scan strategies defined in scan area/scan strategy repository 204 and the current scan strategy in use. Using such an approach print image data may be collected to support a wide rage of print quality defect detection analysis processes without placing undue overhead burden on printing system print operation.

As shown in FIG. 13, the described process begins at step S1302 and proceeds to step S1304.

In step S1304, scan area selection controller 202 may select a first/next scan strategy, i.e., a defined set of scan areas with a defined order of collection, from scan area/scan strategy repository 204, and operation of the method continues to step S1306.

In step S1306, scan area selection controller 202 may select a first/next scan area within the selected scan strategy, and operation of the method continues to step S1308.

If, in step S1308, scan area selection controller 202 determines that a predetermined period of use for the selected scan area has expired, operation of the method continues to step S1310, otherwise operation of the method remains at step S1308.

If, in step S1310, scan area selection controller 202 determines that the selected scan area is the last scan area in the currently selected scan strategy, operation of the method continues to step S1312, otherwise operation of the method returns to step S1306.

If, in step S1312, scan area selection controller 202 determines that the selected scan strategy is the last defined scan strategy, operation of the method continues to step S1314 and the process terminates, otherwise operation of the method returns to step S1304.

It is to be understood that the various functions that support the described print quality defect detection/correction approach may be distributed in any manner among any quantity (e.g., one or more) of hardware and/or software modules or units that may be interconnected with circuitry and/or software interfaces.

The functions that support the described print quality defect detection/correction approach may include any commercially available operating system (e.g., Windows, OS/2, Unix, Linux, DOS, etc.), any commercially available and/or custom software (e.g., communication software, etc.) and any types of input/output devices (e.g., keyboard, mouse, probes, I/O port, etc.).

Software, or firmware, that support the described print quality defect detection/correction approach may be implemented in any desired computer language, and may be developed by one of ordinary skill in the computer and/or programming arts based on the functional description contained herein and illustrated in the drawings. For example, in one example of an embodiment the described device may be written using the C++ programming language or the JAVA programming language. However, the present invention is not limited to being implemented in any specific programming language or combination of programming languages.

Any software associated with the described print quality defect detection/correction approach may be distributed via any suitable media (e.g., removable memory cards, CD-ROM, tape or other storage media diskette, ad-hoc network connection). Software and/or default control parameters may be installed in any manner (e.g., an install program, copying files, entering an execute command, etc.).

The described print quality defect detection/correction approach may accommodate any quantity and any type of data sets in any desired format (e.g., ASCII, plain text, or other format, etc.). The format and structure of internal information structures used to hold intermediate information in support of the described print quality defect detection/correction approach may include, but are not limited to files, arrays, matrices, status and control booleans/variables.

Further, any references herein to software performing various functions generally refer to computer systems or processors performing those functions under software control. The computer system may alternatively be implemented by hardware or other processing circuitry.

From the foregoing description, it will be appreciated that an approach for detecting and correcting printing system print quality defects is disclosed. The described approach improves the integrity of print jobs by allowing defects to be detected and corrected based on an analysis of image data collected over time, across many separate images, under a wide variety of system status and environmental conditions to allow detection of print quality defects that would otherwise be undetectable.

For purposes of explanation, in the above description, numerous specific details are set forth in order to provide a thorough understanding of the described printing system print quality defect detection/correction approach. It will be apparent, however, to one skilled in the art that the described print quality defect detection/correction approach may be practiced without these specific details. In other instances, well-known structures and devices are shown in block diagram form in order to avoid obscuring the features of the described print quality defect detection/correction approach.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method of detecting image quality defects, comprising:
    obtaining an electronic source image including electronic source image data;
    rendering an image based on the electronic source image data;
    capturing the rendered image, the captured image including electronic rendered image data;
    registering the source image with the rendered image;
    storing pixel color defect data related to corresponding pixels in the source image and the rendered image in a pixel color defect data log; and
    analyzing the pixel color defect data from multiple source image/rendered image pairs to identify image quality defects, wherein
    the pixel color defect data log includes a pixel confidence value for each pixel that is measure of whether the individual pixel is a good candidate for use in identifying image quality defects, analyzing the pixel color defect data from multiple source image/rendered image pairs to identify image quality defects comprises:

assessing pixel difference data using interpolation techniques to detect and/or to correct image quality defects within a predetermined color over a predetermined spatial location, and the interpolation techniques include moving matrix interpolation techniques using $$w_t = \frac{1}{\|\bar{x}\|^\alpha + \varepsilon},$$

where x=[p, q, Δc, Δm, Δy, Δk], where p is a datestamp/timestamp for the pixel and q is a measure of a confidence based on the pixel confidence rating stored for the pixel contained in its respective scan area pixel confidence;

Δc, Δm, Δy, Δk are each a source image pixel/rendered image pixel component difference a respective color components of the printing system;

$\|\cdot\|$ is a vector norm (such as 1-norm, 2-norm, etc.); and

α and ε control a smoothness and localization of the interpolation.

2. The method of claim 1, further comprising:
storing in the pixel color defect data log a date-time stamp indicating a date and/or a time of collection of the pixel color data for a source image/rendered image pair from which the pixel color defect data was derived.

3. The method of claim 1, further comprising:
storing a monitored printing system status and/or printing system environment sensor data in association with the pixel color defect data collected for a source image/rendered image pair.

4. The method of claim 1, further comprising:
storing, in a printing system status log, a printing system status and/or printing system environment sensor data in association with one of a date-time stamp, indicating a date and/or a time the printing system status and/or printing system environment sensor data was collected, and a page sequence order, indicating a relative page sequence at which the printing system status and/or printing system environment sensor data was collected.

5. The method of claim 4, further comprising:
matching pixel color defect data with printing system status and/or printing system environment sensor data based on one of a date-time stamp and a page sequence order.

6. The method of claim 1, further comprising:
filtering pixel color defect data log data prior to performing defect analysis based on one or more of:
a specific source image pixel color;
a range of source image pixel colors;
a time period;
a range of page sequence identifiers;
a system status; and
a range of printing system environment sensor values.

7. The method of claim 1, wherein analyzing the pixel color defect data from multiple source image/rendered image pairs to identify image quality defects further comprises:
assessing pixel difference data using interpolation techniques to detect and/or to correct image quality defects within a predetermined color over a predetermined spatial location.

8. The method of claim 7, wherein the interpolation techniques include at least one of:
polynomial fitting techniques; and
moving matrix interpolation techniques.

9. The method of claim 1, wherein pixel color defect data is stored only for one or more scan areas within a registered source image/rendered image pair, each scan area representing a subset of the total area of the registered source image/rendered image pair.

10. The method of claim 9, further comprising:
presenting a user interface that allows a user to select scan areas for which pixel color defect data is collected.

11. The method of claim 10, wherein the user interface displays a rendered image, and the user selects scan areas corresponding to perceived errors in the rendered image.

12. The method of claim 1, further comprising:
generating a pixel confidence map that includes a confidence rating for each pixel for which pixel color defect data has been collected.

13. The method of claim 12, wherein pixel color defect data is stored only for pixels that meet a minimum confidence rating based on a confidence rating stored for each pixel in the pixel confidence map.

14. The method of claim 12, wherein image quality defect analysis is performed using only pixel color defect data for pixels that meet a minimum confidence rating based on a confidence rating stored for each pixel in the pixel confidence map.

15. The method of claim 12, wherein the confidence rating for a pixel is based on one or more of:
a color of the pixel;
a color of surrounding pixels;
a toner coverage;
a standard deviation of the pixel and surrounding pixels; and
a position of the pixel relative to an edge of a scan area.

16. The method of claim 1, wherein the stored pixel color defect data includes a color error between a source image pixel color and a pixel color of a corresponding rendered image pixel.

17. The method of claim 16, further comprising:
converting the color error from a device independent color space to a device dependent color space.

18. The method of claim 17, wherein the independent color space may include one of L*a*b* and sRGB color space and the device dependent color space may include CMYK color space.

19. A printing system, comprising:
a print controller that obtains an electronic source image including electronic source image data;
a print engine that renders an image based on the electronic source image data;
an output imaging device that captures the rendered image, the captured image including electronic rendered image data;
a scan area defect detection module that registers the source image with the rendered image and that generates pixel color defect data for corresponding pixels in the registered source image/rendered image pair;
a pixel color defect data log that stores the pixel color defect data;
a pixel confidence generator that generates a confidence rating for the pixel color defect data; and
a detection/correction processing module that analyzes pixel color defect data and confidence ratings for pixels from multiple source image/rendered image pairs to identify image quality defects, wherein the pixel color defect data log includes a pixel confidence value for each pixel that is measure of whether the individual pixel is a good candidate for use in identifying image quality defects, analyzing the pixel color defect data from multiple source image/rendered image pairs to identify image quality defects comprises:

assessing pixel difference data using interpolation techniques to detect and/or to correct image quality defects within a predetermined color over a predetermined spatial location, and the interpolation techniques include moving matrix interpolation techniques using $$w_t = \frac{1}{\|\bar{x}\|^\alpha + \varepsilon},$$

where $x=[P, q, \Delta c, \Delta m, \Delta y, \Delta k]$, where p is a datestamp/timestamp for the pixel and q is a measure of a confidence based on the pixel confidence rating stored for the pixel contained in its respective scan area pixel confidence;

$\Delta c, \Delta m, \Delta y, \Delta k$ are each a source image pixel/rendered image pixel component difference a respective color components of the printing system;

$\|\cdot\|$ is a vector norm (such as 1-norm, 2-norm, etc.); and $\alpha$ and $\varepsilon$ control a smoothness and localization of the interpolation.

20. An image forming device comprising the system of claim 19.

21. A xerographic image forming device comprising the system of claim 19.

* * * * *